United States Patent [19]

Niwa et al.

[11] Patent Number: 4,711,293

[45] Date of Patent: Dec. 8, 1987

[54] VENTILATOR OF THE HEAT EXCHANGE TYPE

[75] Inventors: Kiyomi Niwa; Yutaka Kozawa, both of Nagoya, Japan

[73] Assignee: Kabushiki Kaisha Toshiba, Kawasaki, Japan

[21] Appl. No.: 24,176

[22] Filed: Mar. 10, 1987

[30] Foreign Application Priority Data

Aug. 28, 1986 [JP] Japan .............................. 61-202198
Aug. 29, 1986 [JP] Japan .............................. 61-203932
Aug. 29, 1986 [JP] Japan .............................. 61-203933

[51] Int. Cl.⁴ ............................................. F28D 19/00
[52] U.S. Cl. ........................................ 165/4; 165/7; 165/8; 165/10; 165/54; 98/33.1
[58] Field of Search ................ 165/4, 7, 8, 10, 54; 98/33.1

[56] References Cited

U.S. PATENT DOCUMENTS

4,196,771 4/1980 Nitteberg ............................. 165/7

FOREIGN PATENT DOCUMENTS

3224277 12/1983 Fed. Rep. of Germany ........ 165/54
55-107848 8/1980 Japan .

Primary Examiner—Albert W. Davis, Jr.
Attorney, Agent, or Firm—Schwartz, Jeffery, Schwaab, Mack, Blumenthal & Evans

[57] ABSTRACT

A ventilator of the heat exchange type includes an air passageway communicating between an interior of a room to be ventilated and the outdoors, a first centrifugal fan for introducing outdoor air to the interior of the room, a second centrifugal fan for discharging indoor air outdoors, both centrifugal fans being disposed within the air passageway so that outlet areas communicates to each other, and two electric motors for alternately driving the centrifugal fans respectively. At least any one of the centrifugal fans is formed of a heat-accumulative material so that heat contained in the indoor air is accumulated in the centrifugal fan formed of the heat-accumulative material and that the heat accumulated in the centrifugal fan is dissipated to the suction air. Heat exchange is thus performed by accumulating the heat in one of the centrifugal fans during indoor air discharge operation and by dissipating the heat to the outdoor air during outdoor air suction operation.

6 Claims, 22 Drawing Figures

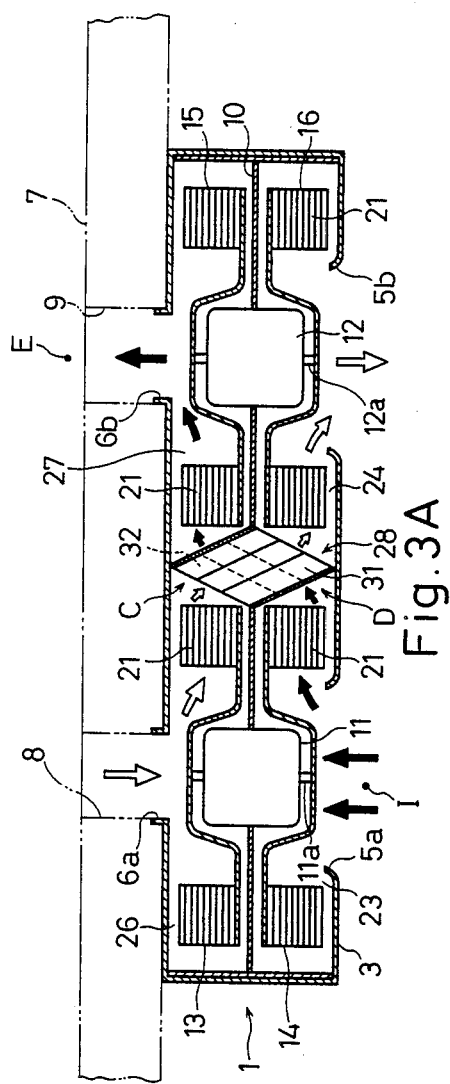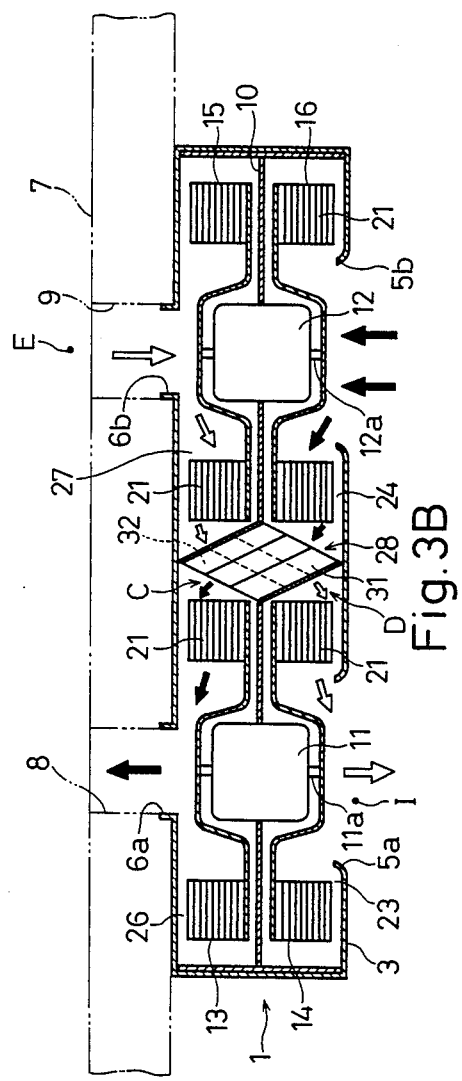

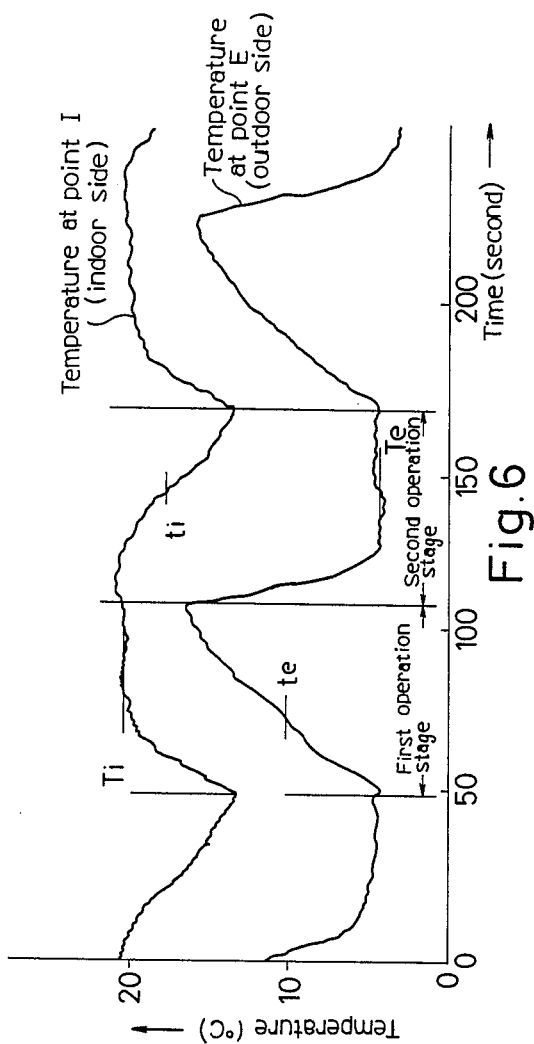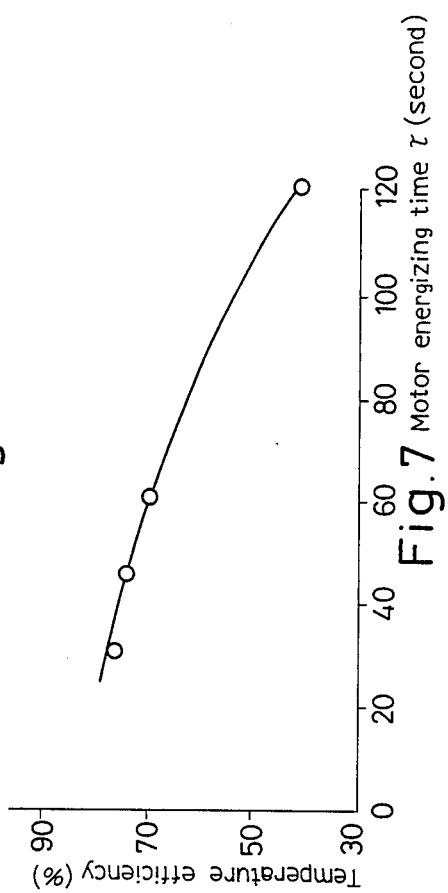

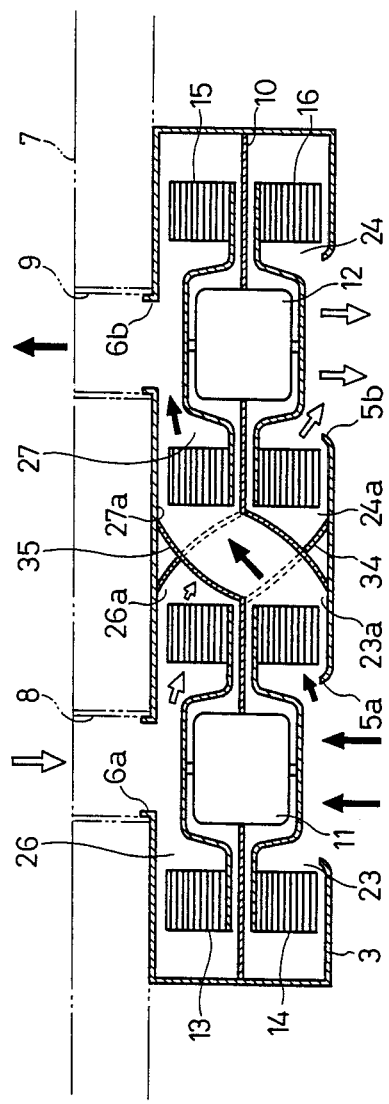
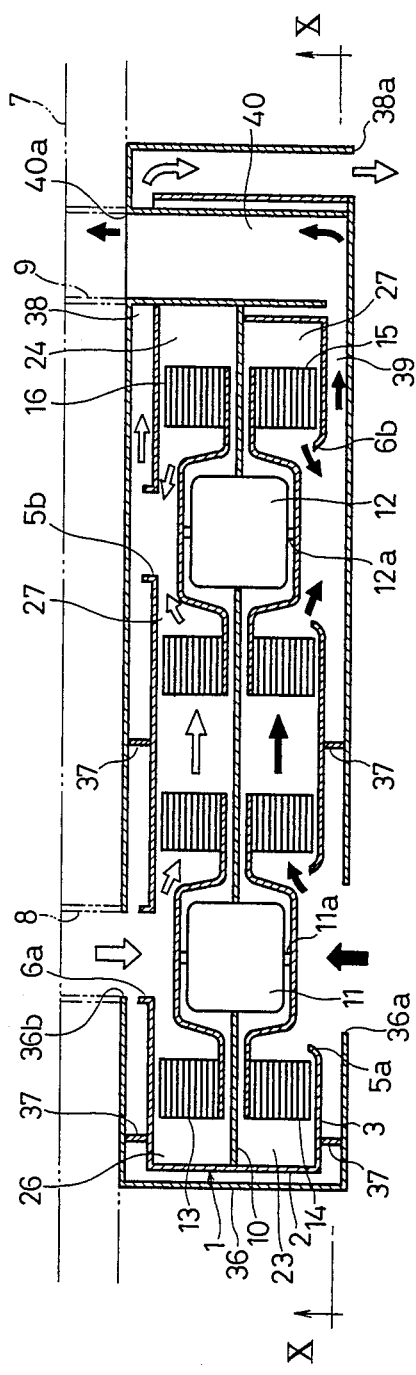
Fig. 8
Fig. 9

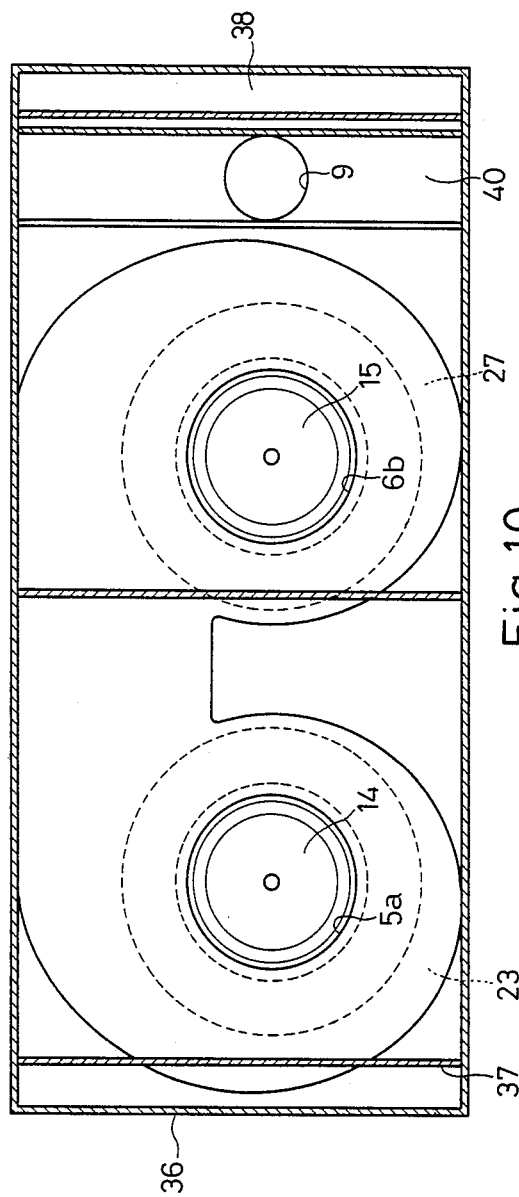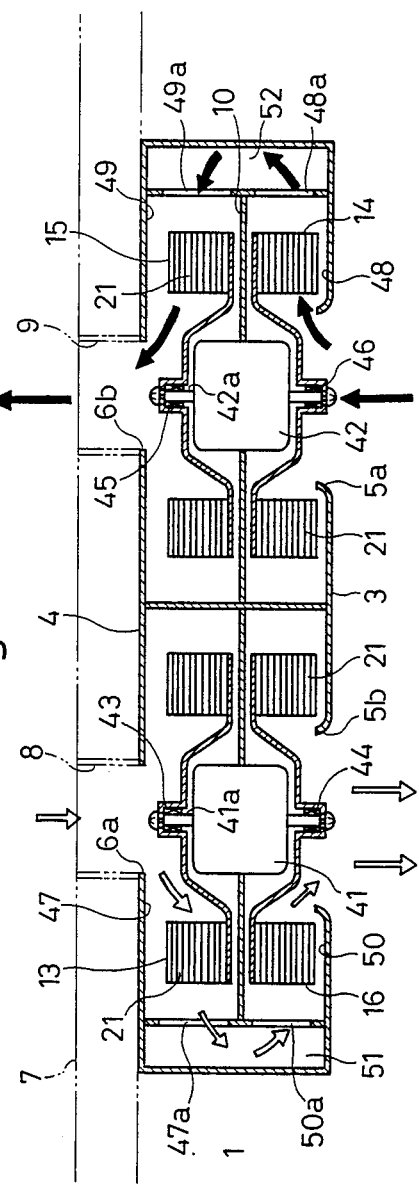

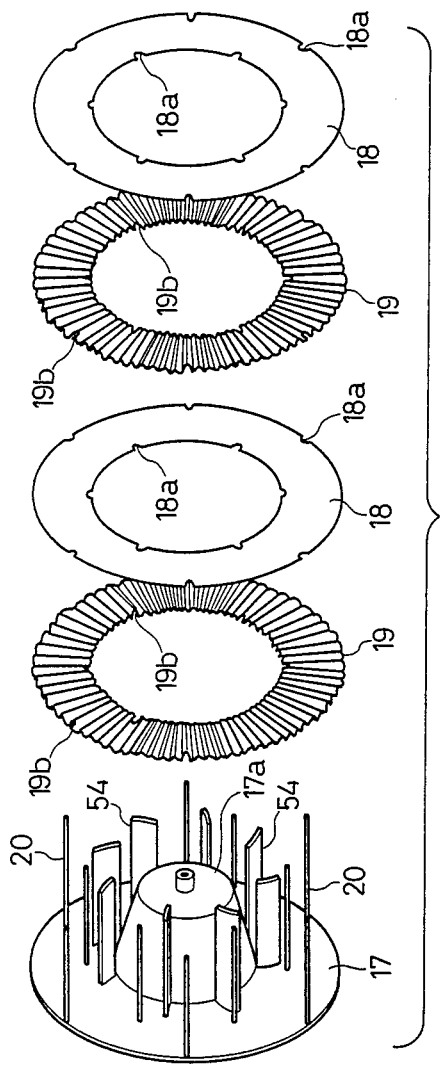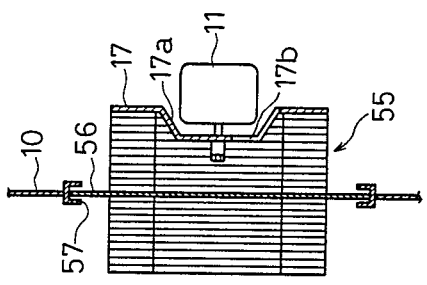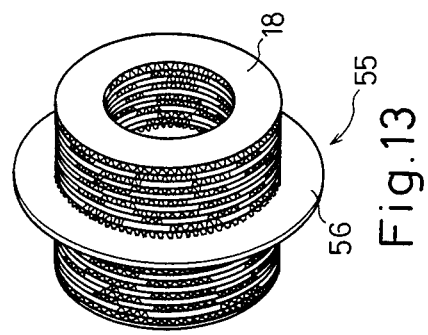
Fig.12
Fig.13
Fig.14

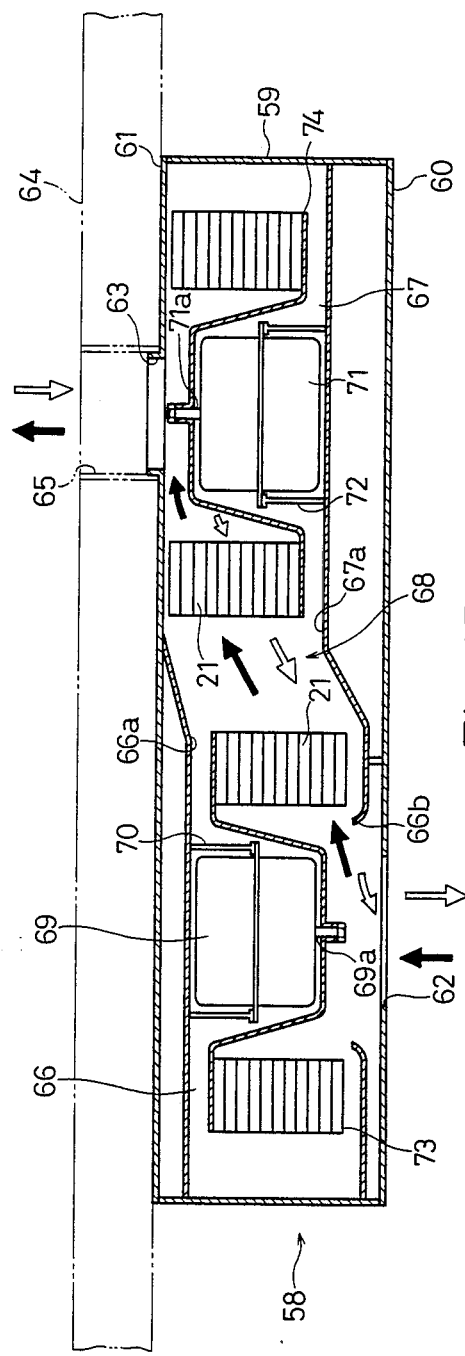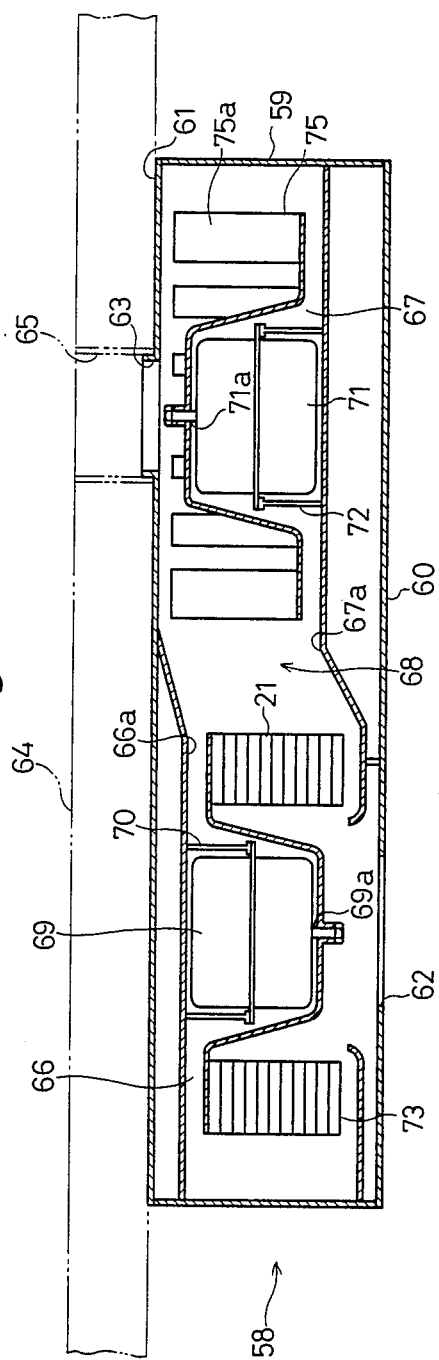

VENTILATOR OF THE HEAT EXCHANGE TYPE

BACKGROUND OF THE INVENTION

1. Field of the Invention

The present invention relates generally to a ventilator of the heat exchange type which comprises centrifugal fans provided in an air passageway for discharging indoor air outdoors and for introducing outdoor air into a room to be ventilated, the centrifugal fans being alternately driven, and more particularly to such an apparatus wherein either of the centrifugal fans is formed of a heat-accumulative material and wherein heat exchange is performed by accumulating heat in the centrifugal fan formed of the heat-accumulative material during indoor air exhaust operation to thereby dissipate the heat to outdoor air during outdoor air suction operation.

2. Description of the Prior Art

Prior art ventilators of the heat exchange type generally comprises, as disclosed in Japanese Utility Model Provisional Publication No. 38668 of 1984, a crossflow heat exchanger and a pair of fan means for introducing outdoor air into the room through the heat exchanger and for discharging indoor air outdoors. As well known in the art, the cross-flow heat exchanger is so constructed that two crossed air flow paths are alternately formed by stacking a number of heat transfer discs with corrugated discs sandwiched therebetween. The heat exchange is performed by introducing the indoor air and the outdoor air into the crossed air flow paths by the fan means.

In the above-described cross-flow heat exchanger, since heat is transferred in accordance with the difference between the temperatures of indoor air and outdoor air flowing along respective sides of the heat transfer plates, heat transfer efficiency is inevitably decreased owing to heat resistance of the heat transfer plates. Furthermore, the corrugated discs occupying most of the inside surface of each air flow path do not serve for the heat exchange and it is the heat transfer plates occupying only part of the inside surface of each air flow path that actually serve for the heat exchange. Consequently, sufficient heat exchange cannot be obtained in the prior art ventilators of the heat exchange type. To provide sufficient heat exchange capacity, the heat exchanger needs to be rendered large-sized, which causes the ventilator to become large-sized.

To overcome the above-described disadvantages, Japanese Patent Provisional Publication No. 107848 of 1980, for example, discloses an improved construction that each flat disc fan comprises a number of flat discs formed of the heat-accumulative material and that the flat discs are stacked in a spaced apart relation. Outdoor air suction and indoor air exhaust operations are alternately performed by alternately inducing transverse air flows in the opposite directions when the flat disc fans are rotated in the forward and reverse directions alternately. According to this construction, since the suction air and exhaust air alternately flow through an identical air passageway, the heat exchange is performed by accumulating heat in the flat discs and by dissipating the heat therefrom. Consequently, the heat exchange efficiency is improved as compared with the cross-flow heat exchanger.

However, the static pressure of air is inherently low in the case of the flat disc fan. The need thus remains to improve the ventilator of the heat exchange type in its blowing capacity. Additionally, each air path formed in the flat disc fans has a flat surface configuration and the transverse air flow is biased in the flat disc fans. As a result, sufficient heat exchange area cannot be obtained. The need also remains to improve the ventilator of the heat exchange type on the point of heat exchange efficiency.

SUMMARY OF THE INVENTION

It is, therefore, a first object of the present invention to provide an improved ventilator of the heat exchange type which can provide sufficient ventilation capacity, that is, sufficient blowing capacity.

It is a second object of the present invention to provide an improved ventilator of the heat exchange type wherein high level heat exchange efficiency can be obtained.

To attain the aforesaid objects, the ventilator of the heat exchange type in accordance with this invention comprises an air passageway communicating between an interior of a room to be ventilated and the outdoors, first centrifugal fan for introducing outdoor air into the room, a second centrifugal fan for discharging indoor air outdoors, the first and second centrifugal fans being disposed before and behind within the air passageway in the direction of air flows, and means for alternately driving the first and second centrifugal fans. At least any one of the first and second centrifugal fans is formed of a material having a large specific heat capacity, that is, a heat accumulative material to thereby accumulate heat during the indoor air exhaust operation and to dissipate the heat to the outdoor air during the outdoor air suction operation.

In the ventilator of the heat exchange type in accordance with this invention, heat is accumulated in the centrifugal fan formed of the heat-accumulative material while the second centrifugal fan is being driven to discharge indoor air. The heat accumulated in the centrifugal fan formed of the heat-accumulative material is dissipated to outdoor air while the first centrifugal fan is being driven to introduce outdoor air into the room. Heat exchange is performed by reiteration of the accumulating and dissipating operations. In this case, since the fans are of the centrifugal type, sufficient air flow capacity is obtained. Furthermore, since the heat is directly transferred from the centrifugal fan formed of the heat-accumulative material to outdoor air passing through the centrifugal fan, the heat resistance is lowered, thereby increasing the heat exchange efficiency. Additionally, since the centrifugal fan formed of the heat-accumulative material as a whole serves as a heat exchanging surface, thereby providing a thin small-sized ventilator.

In another embodiment of the invention, the ventilator of the heat exchange type comprises two individual air passageways, two centrifugal fan units each unit including the first and second centrifugal fans provided within the air passageways respectively in the aforesaid manner. In this arrangement, one unit is driven for suction of outdoor air at the same time when the other unit is driven for exhaust of indoor air. Consequently, the suction and exhaust operations are simultaneously performed with the heat exchange accompanied.

In a modification, the ventilator of the heat exchange type is provided with first and second air passageways each communicating between the interior of the room and the outdoors. One of the centrifugal fan units is provided in the first air passageway and a stationary heat exchanger of the heat accumulation type is provided in the second air passageway. In this arrangement, the blowing capacity and the heat exchange efficiency are also increased, thereby providing a thin small-sized ventilator.

Other and further objects of the present invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

In the accompanying drawings:

FIG. 3A is a transverse cross sectional view of the ventilator of the first embodiment;

FIG. 3B is a view similar to FIG. 3A showing a different operation mode of the ventilator from that in FIG. 3A;

FIG. 6 is a graph showing temperature curves measured at different points in the vicinity of the ventilator of the first embodiment;

FIG. 7 is a graph showing a temperature efficiency curve relative to the ventilator of the first embodiment;

FIG. 8 is a view similar to FIG. 3A showing the ventilator of a second embodiment;

FIG. 9 is a view similar to FIG. 3A showing the ventilator of a third embodiment;

FIG. 10 is a longitudinal sectional view taken along line X-X in FIG. 9;

FIG. 11 is a view similar to FIG. 3A showing the ventilator of a fourth embodiment;

FIG. 12 is an exploded perspective view of a centrifugal fan employed in the ventilator of a fifth embodiment;

FIG. 13 is a perspective view of the centrifugal fan employed in the ventilator of a sixth embodiment;

FIG. 14 is a sectional view of the centrifugal fan shown in FIG. 5 in the condition that it is incorporated in the ventilator;

FIG. 15 is a view similar to FIG. 3A showing the ventilator of a seventh embodiment;

FIG. 16 is also a view similar to FIG. 3A showing the ventilator of an eighth embodiment;

DETAILED DESCRIPTION OF PREFERRED EMBODIMENTS

Figure 1:
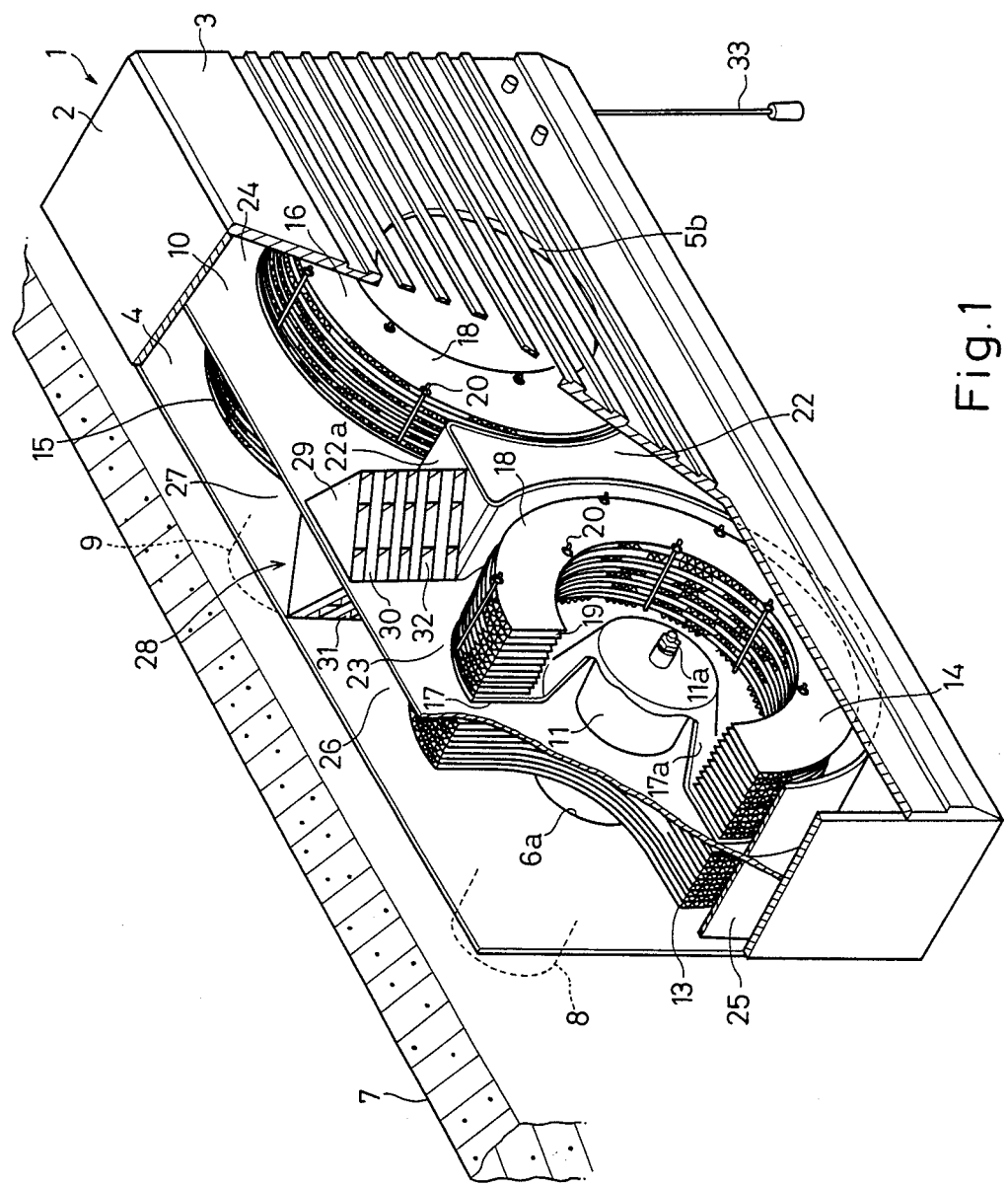
FIG. 1 is a partially broken perspective view of the ventilator of the heat exchange type of a first embodiment in accordance with the present invention.
Figure 2:
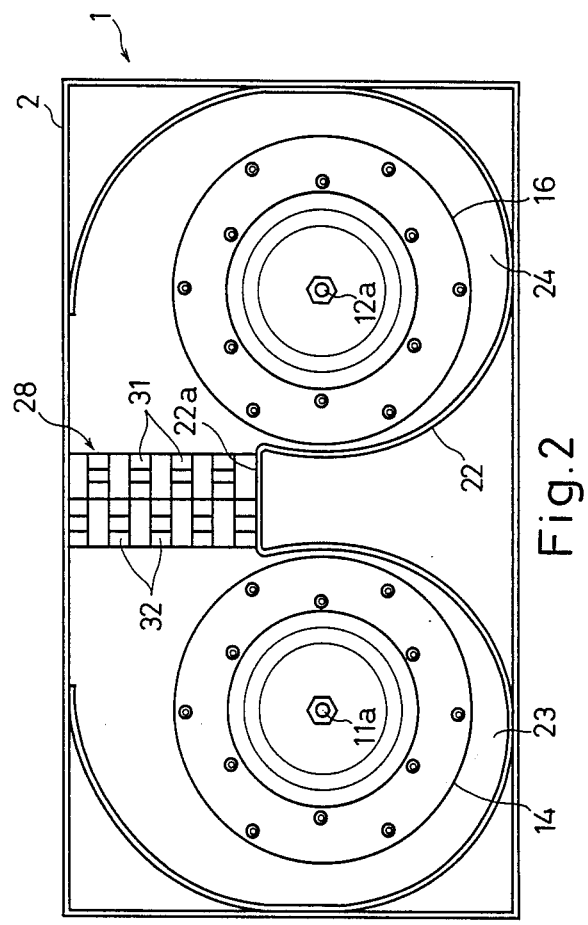
FIG. 2 is a front view of the ventilator of the first embodiment with a front grille eliminated.

First Embodiment (See FIGS. 1-7):

There is shown in FIGS. 1, 2, 3A and 3B an overall construction of the ventilator of the heat exchange type of a first embodiment in accordance with the present invention. As shown, a housing 1 comprises a rectangular frame 2, a front grille 3 and a back plate 4. The front grille 3 and the back plate 4 are secured to front and back sides of the frame 2 respectively so that the housing 1 is formed into a flat box shape. Two vents 5a and 5b are formed in transverse disposition in the front grille 3. The back plate 4 also has two vents 6a and 6b corresponding to the vents 5a and 5b respectively. The housing 1 is, for example, mounted on a side wall 7 of a room to be ventilated and the vents 6a and 6b formed in the back plate 4 are connected to ducts 8 and 9 extending through the side wall 7 respectively so that the vents 6a and 6b communicate to the outdoors. A partition plate 10 extends in parallel with the front grille 3 and the back plate 4 within the housing 1. First and second electric motors 11 and 12 are mounted on two portions of the partition plate 10 respectively, which portions corresponds substantially to the central portions of the the vents 5a and 5b respectively. The motors 11 and 12 are of the biaxial type, that is, both ends of motor shafts 11a and 12a project out of motor-covers.

A first centrigual fan 13 is mounted on one end of the shaft 11a of the motor 11, which end is directed toward the back plate 4. A fourth centrifugal fan 14 is mounted on the other end of the shaft 11a, which end is directed toward the front grille 3. A third centrifugal fan 15 is mounted on one end of the shaft 12a of the motor 12, which end is directed toward the back plate 4. A second centrifugal fan 16 is mounted on the other end of the shaft 12a, which end is directed toward the front grille 3. The first and fourth centrifugal fans 13 and 14 are simultaneously driven by the first motor 11 and the third and second centrifugal fans 15 and 16 are simultaneously driven by the motor 12.

The centrifugal fans 13-16 will now be described in detail. Since the centrifugal fans 13-16 are similarly constructed, description will be given only to the first centrifugal fan 13 with reference to FIGS. 4 and 5. Numeral 17 indicates an end plate having a circular outer peripheral configuration. The end plate 17 has a central frustum 17a which encloses part of the first motor 11. A number of annular discs 18 and annular corrugated discs 19 are alternately stacked on a side of the end plate 17, on which side the frustum is formed. The annular discs 18 and the corrugated discs 19 have the same outer diameter, for example, 224 mm and the same inner and outer diameter ratio as the end plate 17, for example, 0.63. The annular discs 18 and the corrugated discs 19 are formed of a heat-accumulative material, that is, a material having a large specific heat capacity such as vinyl chloride resin of 0.2 mm thickness. Each corrugated disc 19 has a number of, for example, 180 corrugations 19a extending radially. Since the corrugations 19a are formed at equal intervals over the entire periphery of each corrugated disc 19, each space between adjacent corrugations 19a is larger in the the vicinity of the outer periphery of the disc 19 than in the vicinity of the inner periphery thereof. Each corrugation 19a has, for example, the height of 1.6 mm. Six positioning pins 20 are provided along the outer periphery of the end plate 17 and another six positioning pins 20 are provided along a portion of the end plate 17, which portion corresponds to the inner peripheries of the discs 18 and 19. Cutout portions 18a and 19a are formed in the discs 18 and 19 respectively so as to correspond to the positioning pins 20. The annular discs 18 and the corrugated discs 19 are alternately stacked with the positioning pins 20 inserted through the corresponding cutouts 18a and 19a and a last annular disc 19 is fixed to the positioning pins 20 by adhesive so that the annular discs 18 and the corrugated discs 19 are held in position. Consequently, a number of air paths 21 are radially defined by the annular discs 18 and the corrugated discs 19. A cross-sectional area of each air path 21 becomes larger in the vicinity of the outer periphery of the centrifugal fan 13 than in the vicinity of the inner periphery thereof.

When the centrifugal fan 13, constructed as described above, is driven, the static pressure is increased, since the peripheral speed is increased as air flows toward the outer peripheral side of each air path 21. Further, since the cross-sectional area becomes larger in the vicinity of the outer peripheral side than in the vicinity of the inner peripheral side, the flow velocity is decreased, so that the static pressure is increased. Consequently, the fan 13 operates as a centrifugal fan and air is introduced from the inner peripheral side to the outer peripheral side along the air paths 21. Each of the centrifugal fans 13-16 has an outer diameter of approximately 224 mm and an axial dimension of approximately 37 mm. Each centrifugal fan has about twenty layers of air paths 21.

The first and fourth centrifugal fans 13 and 14 are mounted on the motor shaft 11a with the frustums 17a enclosing the first motor 11. Similarly, the second and third centrifugal fans 16 and 15 are mounted on the motor shaft 12a with the frustums 17a enclosing the second motor 12. As shown in FIG. 1, a casing forming member 22 is secured to the front side of the partition plate 10 so that the fourth and second centrifugal fans 14 and 16 are enclosed by the casing forming member 22 except the upper portions thereof, thereby forming casings 23 and 24 of the centrifugal fans 14 and 16 respectively. Similarly, another casing forming member 25 having the same configuration as the member 22 is secured to the back side of the partition plate 10 to thereby form casings 26 and 27 of the first and third centrifugal fans 13 and 15 respectively. Each of the casing forming members 22 and 25 has a central flat surface portion 22a, on which a cross-flow air path assembly 28 extending through the partition plate 10 is mounted. The cross-flow air path assembly 28 comprises a number of partition plates 29 each having a rhombic configuration. The partition plates 29 are stacked with spacers 30 inserted between adjacent plates 29 so that cross-flow air paths extending in substantially perpendicular directions are formed. The cross-flow air path assembly 28 provides first air paths 31 communicating between the casings 24 and 26 and second air paths 32 communicating between the casings 23 and 27.

Numeral 33 indicates a switch string as shown in FIG. 1. When the switch string 33 is pulled once, the first and second motors 11 and 12 are alternately energized, for example, at intervals of one minute, under control of a timer means (not shown) to operate the ventilator. The motors 11 and 12 are deenergized when the switch string 33 is pulled again.

As shown in FIG. 3A, a first air passageway C communicates between the interior of the room and the outdoors through the vent 6a, the first air paths 31 communicating between the casings 26 and 24 and the vent 5b. A second air passageway D communicates between the interior of the room and the outdoors through the vent 5a, the casing 23, the second air paths 32, the casing 27 and the vent 6b. Consequently, the outlet area of the first centrifugl fan 13 communicates to the outlet area of the second centrifugal fan 16 in the first air passageway C and the outlet area of the fourth centrifugal fan 14 communicates to the outlet area of the third centrifugal fan 15 in the second air passageway D. That is, the first and second centrifugal fans 13 and 16 are disposed before and behind within the first air passageway C in the direction of air flows and the fourth and third centrifugal fans 14 and 15 are disposed before and behind within the second air passageway D in the direction of air flows.

The operation of the ventilator of the first embodiment will now be described. When the switch string 33 is pulled by an operator, the first motor 11 is energized for a minute to thereby drive the first and second centrifugal fans 13 and 14 simultaneously. The second motor 12 is not energized while the first motor 11 is being energized, so that the second and third centrifugal fans 16 and 15 keep the shutdown condition. Since rotation of the first centrifugal fan 13 causes air to flow through the air paths 21 thereof from an inner peripheral side to an outer peripheral side, outdoor air is introduced into the casing 26 through the duct 8. The outdoor air is further introduced into the casing 24 through the first air paths 31 of the cross-flow air path assembly 28. In the casing 24, the outdoor air flows through the air paths 21 from the outer peripheral side to the inner peripheral side of the second centrifugal fan 16 which is not being driven, thereby introducing the outdoor air into the room from the vent 5b of the front grille 3. The flow of outdoor air described above is shown by void arrows in FIG. 3A. Since the fourth centrifugal fan 14 is driven simultaneously, air flows through the air paths 21 from the inner peripheral side to the outer peripheral side of the centrifugal fan 14 to thereby introduce indoor air into the casing 23 through the vent 5a. The indoor air is further introduced into the casing 27 through the second air paths 32 of the cross-flow air path assembly 28. In the casing 27, the indoor air flows through the air paths 21 from the outer peripheral side to the inner peripheral side of the third centrifugal fan 15 which is not being driven, thereby discharging the indoor air outdoors through the duct 9. The above-described exhaust air flow is shown by bold arrows in FIG. 3A. This simultaneous exhaust-suction operation performed by the first and fourth centrifugal fans 13 and 14 will hereinafter be referred to as "a first operation stage." The first motor 11 is deenergized under control of the timer means after the first operation stage continues for a minute. The second motor 12 is then energized for a minute instead of the first motor 11, thereby driving the second and third centrifugal fans 16 and 15. Since rotation of the third centrifugal fan 15 causes air to flow through the air paths 21 thereof from the inner peripheral side to the outer peripheral side, the outdoor air is introduced into the casing 27 through the duct 9. The outdoor air is then introduced into the casing 23 through the second air paths 32 of the cross-flow air path assembly 28. In the casing 23, the outdoor air flows through the air paths 21 from the outer peripheral side to the inner peripheral side of the fourth centrifugal fan 14 which is not being driven. Thus the outdoor air is introduced into the room through the vent 5a of the front grille 3. The above-described suction air flow is shown by void arrows in FIG. 3B. As apparent from comparison of FIG. 3B with FIG. 3A, the suction air flow in FIG. 3B is the reverse of the exhaust air flow in the first operation stage.

On the other hand, rotation of the second centrifugal fan 16 causes air to flow through the air paths 21 from the inner peripheral side to the outer peripheral side of the fan 16, thereby introducing the indoor air into the casing 24 through the vent 5b of the front grille 3. The indoor air is then introduced into the casing 26 through the first air paths 31 of the cross-flow air path assembly 28. In the casing 26, the indoor air flows through the air paths 21 from the outer peripheral side to the inner peripheral side of the first centrifugal fan 13 which is not being driven. The indoor air is thus discharged outdoors through the duct 8. The abovedescribed exhaust air flow is shown by bold arrows in FIG. 3B. As apparent from comparison of FIG. 3B with FIG. 3A, the exhaust air flow is the reverse of the suction air flow in the first operation stage. The simultaneous exhaust-suction operation performed by the third and second centrifugal fans 15 and 16 will hereinafter be referred to as "a second operation stage." The first motor 11 is again energized after the second operation stage continues for a minute. Thus, the motors 11 and 12 are alternately energized at intervals of a minute, that is, the first and second operation stages are alternately reiterated at intervals of a minute.

Suppose now that ventilation of a room which is being heated with a suitable heating means is being performed. The temperature of the indoor air is higher than that of the outdoor air. Consequently, since the indoor air of high temperature is introduced into the air paths 21 of the fourth and third centrifugal fans 14 and 15 in the first operation stage, the annular discs 18 and the corrugated discs 19 of the centrifugal fans 16 and 14 are heated when the indoor air flows therethrough, thereby accumulating heat therein. In the second operation stage shown in FIG. 3B, the low temperature outdoor air is introduced into the air paths 21 of the third and fourth centrifugal fans 15 and 14. Simultaneously, the outdoor air flows through the air paths 21 of the second and first centrifugal fans 16 and 13. Consequently, when flowing through the air paths 21 of the third and fourth centrifugal fans 15 and 14 in the second operation stage, the outdoor air is heated owing to heat dissipation from the annular discs 18 and the corrugated discs 19 of the third and fourth centrifugal fans 15 and 14 in which heat has been accumulated in the first operation stage. In this while, since the indoor air is introduced through the air paths 21 of the second and first centrifugal fans 16 and 13, heat is accumulated in the fans 16 and 13. The heat is dissipated to the outdoor air introduced through the air paths 21 of the first and second centrifugal fans 13 and 16 in the following first operation stage and the heated outdoor air is introduced into the room. Dirty indoor air is thus discharged outdoors and clean outdoor air is introduced into the room while the heating operation is being performed in the room. Consequently, heat loss is effectively prevented.

The inventors measured temperature rise of the outdoor air introduced by means of simultaneous exhaust-suction operation in the case where the heating operation is being performed in the room. FIG. 6 shows temperature changes at a place in the vicinity of the vent 5a of the front grille 3, which place corresponds to point I in FIGS. 3A and 3B, and at a place in the vicinity of the duct 9, which place corresponds to point E in FIGS. 3A and 3B. In this case, the measurement was executed in winter in condition that the outdoor and indoor temperatures are 5° C. and 21° C. respectively. The temperature changes were measured with automatic temperature recording gauges. Referring to FIG. 6, since the heat contained in the indoor air is transferred to and accumulated in the fourth and third centrifugal fans 14 and 15 in the first operation stage, the temperature at point E is not immediately increased even though the indoor temperature is 21° C. On the other hand, since the warm indoor air flows through the vent 5a, the temperature at point I rapidly approximates to the room temperature. In the second operation stage, when low temperature outdoor air flows through the duct 9, the temperature at point E is rapidly decreased. However, in spite that the temperature of outdoor air is low, the temperature at point I, through which the outdoor air flows, approximates to the room temperature at first and the degree of temperature decrease at point I presents a slack curve. This is because the outdoor air is heated when flowing through the fourth and third centrifugal fans 14 and 15 in which heat is accumulated in the first operation stage. A mean temperature it gained by averaging temperature changes at point I in the second operation stage is approximately 17.5° C., which value is higher than the outdoor temperature. That is, according to the ventilator of the first embodiment, clean outdoor air, the temperature of which is 5° C., is introduced into the room with the temperature thereof increased to approximately 17.5° C. where the room temperature is 21° C.

FIG. 7 shows a relationship between the temperature efficiency $\eta$ and a time period $\tau$ during which each of the motors 11 and 12 is energized in each operation stage. In this case, the temperature efficiency $\eta$ is a result of arithmetic means of suction side temperature efficiency $\eta_1$ and exhaust side temperature efficiency $\eta_2$. The suction and exhaust temperature efficiencies $\eta_1$ and $\eta_2$ are defined as follows:

$$\eta_1 = (ti - Te)/(Ti - Te)$$

$$\eta_1 = (Ti - Te)/(Ti - Te)$$

where
 ti=mean temperature at point I in the second stage
 te=mean temperature at point E in the first stage
 Ti=room temperature
 Te=outdoor temperature It is obvious from FIG. 7 that approximately 70% of temperature efficiency is gained where the motor energizing time period takes the value of 60 seconds, though the temperature efficiency is decreased with increase of the motor energizing time period $\tau$.

The ventilator of the heat exchange type of the first embodiment is characterized in that the heat exchange is performed by introducing exhaust and suction air flows through the identical air passageway alternately to accumulate heat in the centrifugal fans and to dissipate the heat therefrom. The heat exchange is not performed in the manner employed in the prior art cross-flow heat exchanger. That is, in the present invention, high temperature exhaust air directly touches the centrifugal fans so that the heat is accumulated in the centrifugal fans. Low temperature suction air is directly heated owing to heat dissipation from the centrifugal fans when flowing therethrough. Consequently, heat transfer efficiency is increased in the ventilator of the present invention as compared with the prior art ventilator incorporating the cross-flow heat exchanger. Furthermore, since the entire surface of the air paths 21 of each centrifugal fan serves for the heat exchange, a heat exchanging area is increased as compared with the prior art cross-flow heat exchanger wherein the heat exchanging area is confined to the surface of the heat transfer plates. As a result, the heat exchange efficiency is increased, which renders each centrifugal fan small-sized. Additionally, since each centrifugal fan has a sufficient blowing capacity as well as a sufficient heat exchange capacity, the use of an exclusive blowing means is denecessitated. As a result, the ventilator can be rendered small-sized and thinner. In comparison of the ventilator of this invention with the prior art ventilator incorporating the cross-flow heat exchanger, an overall capacity is reduced by approximately 40%. Furthermore, since the ventilator of this invention employs centrifugal fans each of which has a number of air paths 21 radially formed, the static pressure and the blowing capacity are increased as compared with the flat-disc fan disclosed in Japanese Patent Provisional Publication No. 107848 of 1980.

In the ventilator of the present invention, since the exhaust and suction operations are performed simultaneously, it may be used for ventilation of a room having a high level air-tightness. In the first embodiment, particularly, the centrifugal fans 13-16 are similarly constructed, so that decrease in kinds of parts provides cost reduction.

Although the ventilation of the room in which the heating operation is being performed has been described in the first embodiment, the ventilator of this invention may be applied to ventilation of the room in which the cooling operation is being performed in summer. In this case, since high temperature outdoor air is cooled and introduced into the room, the ventilation is performed without decreasing cooling effect.

Additionally, when either of the first and second motors 11 and 12 is continuously energized, exhaust and suction air flows are continuously induced without change of flow direction. Consequently, the ventilation may be performed without heat exchange.

Second Embodiment (See FIG. 8):

The ventilator of a second embodiment in accordance with this invention will now be described with reference to FIG. 8. The ventilator of the second embodiment differs from that of the first embodiment in construction of first and second air paths. In the previous embodiment, the cross-flow air path assembly 28 provides the first and second air paths 31 and 32 each comprising layers of air paths. In the second embodiment, first and second ducts 34 and 35 are provided in vertically adjacent disposition. Outlets 26a and 24a are formed in opposed relation at lower portions of the casings 26 and 24 respectively. The duct 34 communicates between the outlets 26a and 24a to thereby provide a first air path. Outlets 23a and 27a are formed at upper portions of the casings 23 and 27. The duct 35 positioned on the duct 34 communicates between the outlets 23a and 27a to thereby provide a second air path. Other arrangements of parts are identical with those in the first embodiment, so that identical parts are labelled by the same reference numerals as in the first embodiment. According to the construction of the second embodiment, the exhaust air flow is also shown by bold arrows in FIG. 3A in the first operation stage and the suction air flow is shown by void arrows in FIG. 3A. In the second operation stage, the exhaust air flow is the reverse of the suction air flow in the first operation stage and the suction air flow is the reverse of the exhaust air flow in the first operation stage. Accordingly, the same effect is attained as in the first embodiment.

Third Embodiment (See FIGS. 9 and 10):

FIGS. 9 and 10 show a third embodiment of the invention. The housing 1 is enclosed in an outer cover 36 and a plurality of spacers 37 are provided between the housing 1 and an inner surface of the outer cover 36 to thereby define auxiliary air flow paths 38 and 39. The auxiliary air flow path 38 communicates to the vent 5b of the casing 24 and the other auxiliary air flow path 39 communicates to the vent 6b of the casing 27. Auxiliary vents 36a and 36b are formed in front and back sides of the outer cover 36 respectively. The auxiliary vents 36a and 36b communicate to the vents 5a and 6a respectively. The auxiliary air flow path 38 communicates to the interior of the room through the opening 38a. The auxiliary air flow path 39 communicates to the duct 9 through an inner duct 40 and an opening 40a. The auxiliary air flow paths 38 and 39 serve for the cross-flow path assembly 28 in the first embodiment and the ducts 35 and 36 in the second embodiment. In the construction described above, the outdoor and indoor air flows are also shown by void and bold arrows respectively in the first operation stage. In the second operation stage, the exhaust and suction air flows are the reverse of those in the first operation stage respectively, thereby performing the heat exchange.

Fourth Embodiment (See FIG. 11):

FIG. 11 shows a fourth embodiment of this invention. First and second reversible motors 41 and 42 are mounted on the partition plate 10 in transverse disposition. The first centrifugal fan 13 is mounted on one end of the shaft 41a of the motor 41, which end is directed toward the back plate 4, through a one-way clutch 43 provided therebetween. The second centrifugal fan 16 is mounted on the other end of the shaft 41a of the motor 41, which end is directed toward the front grille 3, through a second one-way clutch 44. Similarly, the third centrifugal fan 15 is mounted on one end of the shaft 42a of the motor 42, which end is directed toward the back plate 4, through a third one-way clutch 45 and the fourth centrifugal fan 14 is mounted on the other end of the shaft 42a of the motor 42 through a fourth one-way clutch 46 provided therebetween. Rotation of the motors 41 and 42 is transmitted to the first and fourth centrifugal fans 13 and 14 through the first and fourth one-way clutches 43 and 46 respectively when the shafts 41a and 42a are rotated in the clockwise direction as seen from the interior of the room. This clockwise rotation of the motor shafts 41a and 42a will hereinafter be referred to as "forward rotation." Rotation of the motor shafts 41a and 42a is not transmitted to the first and fourth centrifugal fans 13 and 14 when the motor shafts 41a and 42a are rotated in the counterclockwise direction as seen from the interior of the room. This counterclockwise rotation of the motor shafts 41a and 42a will hereinafter be referred to as "reverse rotation." When the motor shafts 41a and 42a are rotated in the reverse direction, rotation thereof is transmitted to the second and third centrifugal fans 16 and 15 through the second and third one-way clutches 44 and 45 respectively, thereby driving the second and third centrifugal fans 15 and 16. Rotation of the motor shafts 41a and 42a is not transmitted to the second and third centrifugal fans 15 and 16 respectively when the motor shafts 41a and 42a are rotated in the forward direction. In this case, the first and second one-way clutches 43 and 44 constitute a first selective motor rotation transmitting means and the third and fourth one-way clutches 45 and 46 constitute a second selective motor rotation transmitting means.

Casings 47–50 are provided within the housing 1 to enclose the centrifugal fans respectively. An outlet area of the casing 47 enclosing the first centrifugal fan 13 communicates to an outlet area of the casing 50 enclosing the second centrifugal fan 16, through openings 47a and 50a and a first air path 51 formed at the left end portion within the housing 1. An outlet area of the cansing 49 enclosing the third centrifugal fan 15 communicates to an outlet area of the casing 48 enclosing the fourth centrifugal fan 14, through openings 49a and 48a and a second air path 52 formed at the right end portion within the housing 1. The motors 41 and 42 are alternately energized so that the motor shafts 41a and 42a are alternately rotated in the forward and reverse directions under control of a timer means (not shown), for example, at intervals of a minute.

In operation of the ventilator of the fourth embodiment, when the shafts of the motors 41 and 42 are rotated in the forward direction, the first and fourth centrifugal fans 13 and 14 are simultaneously driven. Owing to rotation of the first centrifugal fan 13, outdoor air is introduced into the casing 47 through the vent 6a of the back plate 4. In the casing 47, the outdoor air flows through the air paths 21 of the first centrifugal fan 13 from the inner peripheral side to the outer peripheral side. The outdoor air is further introduced into the casing 50 through the opening 47a, the first air path 51 and the opening 50a. In the casing 50, the outdoor air flows through the air paths 21 of the second centrifugal fan from the outer peripheral side to the inner peripheral side to be thereby introduced into the room through the vent 5b of the front grille 3. This outdoor air flow is shown by void arrows in FIG. 11. Simultaneously, rotation of the fourth centrifugal fan 14 causes indoor air to flow into the casing 48 through the vent 5a of the front grille 3. In the casing 48, the indoor air flows through the air paths 21 of the fourth centrifugal fan 14 from the inner peripheral side to the outer peripheral side to be thereby introduced into the casing 49 through the second air path 52 and the opening 49a. In the casing 49, the indoor air flows through the air paths 21 of the third centrifugal fan 15 from the outer peripheral side to the inner peripheral side to be thereby discharged outdoors through the vent 6b of the back plate 4. This indoor air flow is shown by bold arrows in FIG. 11. The above-described first operation stage continues for a minute and then the motor shafts 41a and 42a are rotated in the reverse direction to perform simultaneous exhaust-suction operation at the second operation stage. At the second operation stage, rotation of the motor shafts 41a and 42a is transmitted to the second and third centrifugal fans 16 and 15 through the one-way clutches 44 and 45 respectively, while the first and fourth centrifugal fans 13 and 14 are not driven. Accordingly, the exhaust air flow at the second operation stage is the reverse of the suction air flow at the first operation stage. Consequently, heat exhange is performed between exhaust and suction air flows with high efficiency as in the first embodiment.

Fifth Embodiment (See FIG. 12):

FIG. 12 illustrates a fifth embodiment of the invention. As shown in FIG. 12, each centrifugal fan 53 is provided with a plurality of auxiliary blades 54. The auxiliary blades 54 are disposed at equal intervals along an inner peripheral portion of the end plate 17, which inner peripheral portion is enclosed by the annular discs 18 and the corrugated discs 19. Provision of the auxiliary blades 54 further increases the static pressure. Consequently, since the blowing capacity of the ventilator is further increased, such centrifugal fan 53 may be rendered thinner than that employed in the first embodiment, thereby reducing the thickness of the ventilator.

Sixth Embodiment (See FIGS. 13 and 14):

FIGS. 13 and 14 also show a modification of the centrifugal fan. Four individual centrifugal fans are employed in the previous embodiments. In the sixth embodiment, however, a centrifugal fan assembly 55 comprises two centrifugal fans connected axially. The end plate 17 has apertures 17b formed radially. An auxiliary circular partition plate 56 is provided at the middle of the fan assembly 55. The partition plate 56 has a larger diameter than the fan assembly 55. As shown in FIG. 14, a frange portion of the partition plate 56 is rotatably received by an annular groove 57 formed in the partition plate 10 so that two inside compartments divided by the plate 10 are air-tightly closed. The ventilator of the sixth embodiment, thus constructed, provides the same effect as in the first embodiment.

Figure 5:
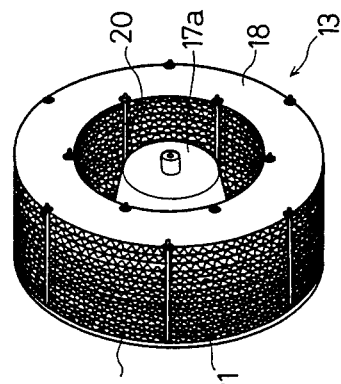
FIG. 5 is a perspective view of the centrifugal fan in instoration.
Figure 4:
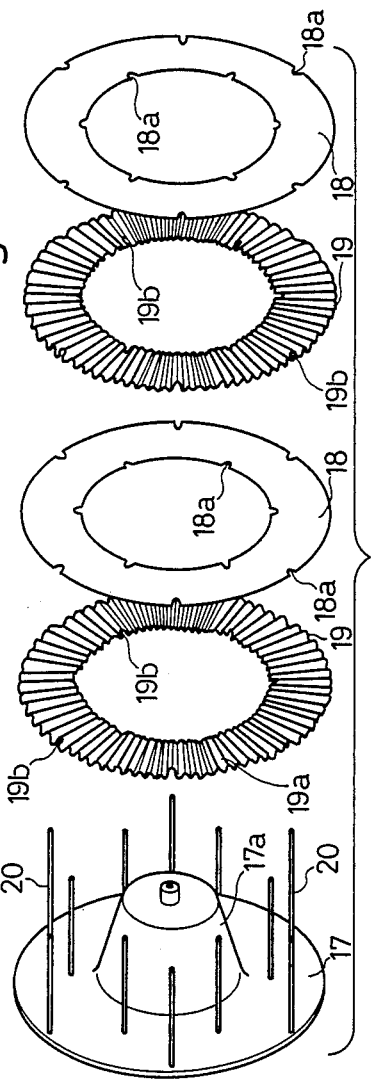
FIG. 4 is an exploded perspective view of a centrifugal fan employed in the ventilator of the first embodiment.

Seventh Embodiment (See FIG. 15):

FIG. 15 shows a seventh embodiment. The housing 58 comprises the rectangular frame 59, the front grille 60 and the back plate 61. The front grille 60 and the back plate 61 are secured to the frame 59 so that the housing 58 has a flat box-shape. As shown in FIG. 15, a vent 62 is formed at the left-hand portion of the front grille 60 and a vent 63 is formed at the right-hand portion of the back plate 61. The housing 58 is, for example, mounted on the side wall 64 of the room to be ventilated so that the duct 65 extending through the side wall 64 communicates to the vent 63. An air path 68 communicates between outlets 66a and 67a of the respective casings 66 and 67. An inlet 66b of the casing 66 communicates to the vent 62 of the front grille 60 and the suction side of the csing 67 communicates to the vent 63 of the back plate 61. The motor 69 is provided in the casing 66 and mounted on a support leg 70. The shaft 69a of the motor 69 is directed toward the front grille 60. The motor 71 is mounted on a support leg 72 in the casing 67. The shaft 71a of the motor 71 is directed toward the back plate 61. The centrifugal fan 73 for exhaust operation, corresponding to the second centrifugal fan in the first embodiment, is mounted on the shaft 69a of the motor 69 provided in the casing 66. The centrifugal fan 74 for suction operation, corresponding to the first centrifugal fan in the first embodiment, is mounted on the shaft 71a of the motor 71 provided in the casing 67. The centrifugal fans 73 and 74 have the same construction as shown in FIG. 5 and a number of air paths 21 are formed therein.

In operation of the ventilator of the seventh embodiment, when an operation switch (not shown) is turned on, the motor 69 is first energized for a minute to drive the second centrifugal fan 73. The first centrifugal fan 74 is not driven in this while. Rotation of the second centrifugal fan 73 causes air to flow through the air paths 21 thereof from the inner peripheral side to the outer peripheral side. Consequently, indoor air is introduced into the casing 67 through the outlet 66a of the casing 66. In the casing 66, the indoor air flows through the air paths 21 of the first centrifugal fan 74 in shut-down condition from the outer peripheral side to the inner peripheral side. The indoor air is then discharged outdoors through the vent 63 and the duct 65. The above-described exhaust air flow is shown by bold arrows in FIG. 15. The motor 69 is deenergized under control of the timer means after the exhaust operation continues for a minute. The motor 71 is then energized for a minute to drive the first centrifugal fan 74. Rotation of the first centrifugal fan 74 causes outdoor air to flow into the casing 67 through the duct 65. The outdoor air is introduced into the casing 66 through the air path 68. In the casing 66, the outdoor air flows through the air paths 21 of the first centrifugal fan 73 which is not being driven. The outdoor air is then introduced into the room through the vent 62. The above-described suction air flow is shown by void arrows in FIG. 15. Thus, the exhaust and suction operations are alternately performed, so that the heat exchange occurs in the same manner as in the first embodiment.

Eighth Embodiment (See FIG. 16):

The ventilator of an eighth embodiment differs from that of the seventh embodiment in the construction of the first centrifugal fan 75 for suction operation. That is, a conventional centrifugal multiblade fan is employed as the first centrifugal fan 75 for suction operation. The multiblade fan comprises a number of blades 75a disposed circularly. Other arrangements are the same as in the seventh embodiment.

Heat is accumulated in the second centrifugal fan 73 when the exhaust air flows through the air paths 21 of the fan 73 from the inner peripheral side to the outer peripheral side. The heat is dissipated to the suction air which flows through the air paths 21 of the centrifugal fan 73 from the outer peripheral side to the inner peripheral side. Consequently, the heat exchange is performed between the exhaust and suction air flows.

In the embodiments as far as heretofore described, each of the ventilators of the first to fourth embodiments shown in FIGS. 1, 8, 9 and 11 respectively comprises two ventilating units each unit including two centrifugal fans for simultaneous exhaust-suction operation, the outlet areas of which communicate to each other. Whereas, in the seventh and eighth embodiments, shown in FIGS. 15 and 16 respectively, each ventilator comprises one ventilating unit, wherein the exhaust and suction operations are not performed simultaneously.

Figure 17A:
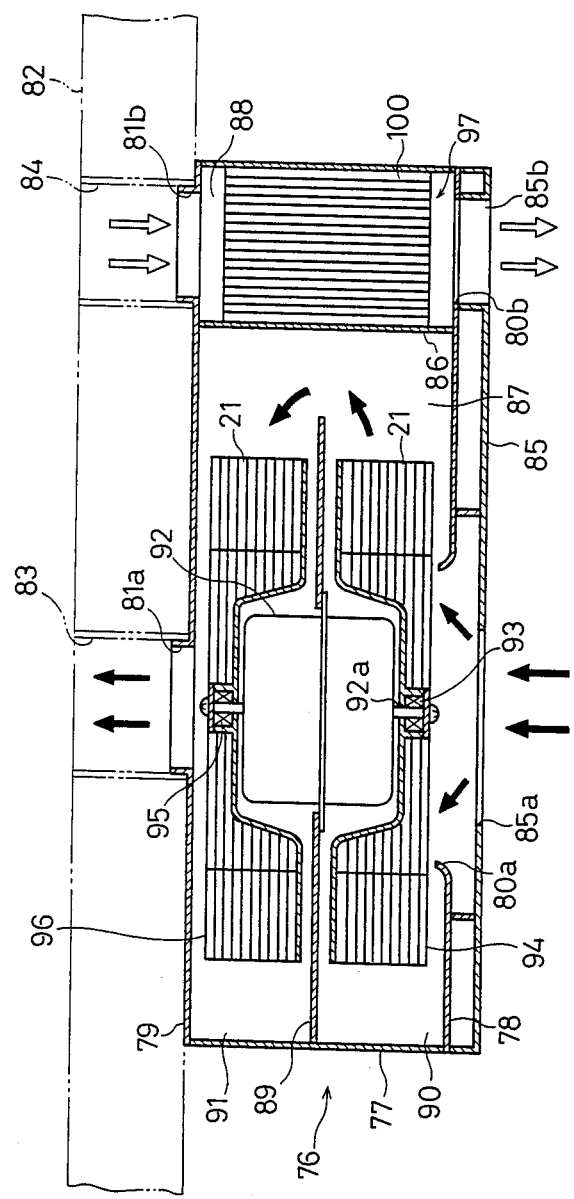
FIG. 17A is also a view similar to FIG. 3A showing the ventilator of a ninth embodiment.

Ninth Embodiment (See FIGS. 17A, 17B and 18):

Referring to FIG. 17A, the front grille 78 and the back plate 79 are secured to the frame 77 to compose the housing 76 of the flat box-shape. A vent 80a is formed in the vicinity of the center of the front grille 78 of the housing 76 and a vent 80b is formed in the vicinity of the right-hand end portion of the front grille 78. The back plate 79 has also a vent 81a formed in the vicinity of the central portion thereof and a vent 81b formed in the vicinity of right-hand end portion thereof. The housing 76 is, for example, mounted on the side wall 82 of the room to be ventilated so that ducts 83 and 84 both extending through the side wall 82 communicate to the vents 81a and 81b respectively. A cover plate 85 is secured to the front grille 78. The cover plate 85 has vents 85a and 85b formed in opposed relation to the vents 80a and 80b respectively. A partition plate 86 is provided between the front grille 78 and the back plate 79 so that the interior of the housing 76 is divided into two compartments. The right-hand compartment serves as the second air passageway. The left-hand compartment is further partitioned by a support plate 89 except the right-hand area thereof so that a first air passageway 87 is provided. Provision of the support plate 89 forms two casings 90 and 91 within the housing 76. Outlet areas of the casings 90 and 91 communicate to each other. A reversible motor 92 is mounted on the central portion of the support plate 89. A centrifugal fan 94 for exhaust operation, corresponding to the second centrifugal fan in the first embodiment, is mounted on one end of the motor shaft 92a with the one-way clutch 93 provided therebetween, which end is directed toward the front grille 78. A centrifugal fan 96 for suction operation, corresponding to the first centrifugal fan in the first embodiment, is mounted on the other end of the motor shaft 92a with the one-way clutch 95 provided therebetween. The one-way clutch 93 transmits rotation of the motor shaft 92a to the centrifugal fan 94 when the shaft 92a is rotated in the clockwise direction as seen from the interior of the room. This clockwise rotation of the motor shaft 92a will hereinafter be referred to as "forward rotation." The one-way clutch 93 is designed not to transmit the rotation of the motor shaft 92a to the centrifugal fan 94 when the motor shaft 92a is rotated in the counterclockwise direction as seen from the interior of the room. This counterclockwise rotation of the motor shaft 92a will hereinafter be referred to as "reverse rotation." The other one-way clutch 95 is designed to transmit the rotation of the motor shaft 92a to the centrifugal fan 96 when the motor shaft 92a is rotated in the reverse direction and not to transmit the rotation of the motor shaft 92a to the centrifugal fan 96 when the motor shaft 92a is rotated in the forward direction. When the operation switch (not shown) is turned on, the motor 92 is energized to reiterate forward and reverse rotations alternately at intervals of a minute, for example, under control of the timer means (not shown). Centrifugal fans 94 and 96 have the same construction as shown in FIG. 5.

Figure 18:
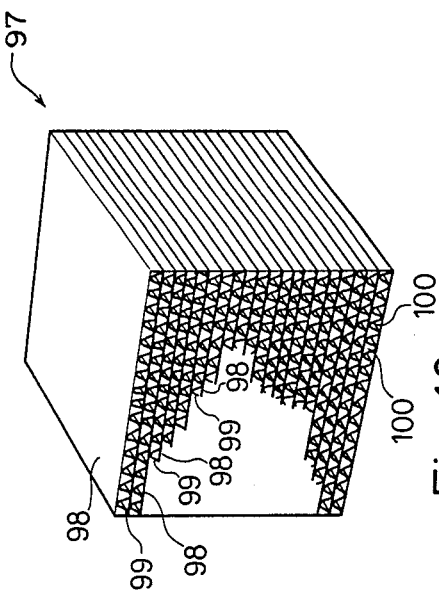
FIG. 18 is a perspective view of the heat exchanger of the heat accumulation type employed in the ventilator shown in FIG. 17A.

The second air passageway 88 communicates to the interior of the room through the vents 80b and 85b and to the atmosphere through the vent 81a and the duct 84. A heat exchanger 97 of the heat accumulation type is provided in the second air passageway 88. As shown in FIG. 18, the heat exchanger 97 comprises a number of rectangular partition plates 98 and rectangular corrugated plates 99, both plates being alternately stacked in a conventional manner. Each corrugated plate 99 has a number of corrugations extending in the identical direction. Accordingly, a number of air paths 100 are formed between each partition plate 98 and adjacent corrugated plates 98 so that air flows through the air paths 100 in the second air passageway 88. The partition plates 98 and the corrugated plates 99 are formed of a heat-accumulative material such as vinyl chloride resin of 0.2 mm thickness.

Figure 17B:
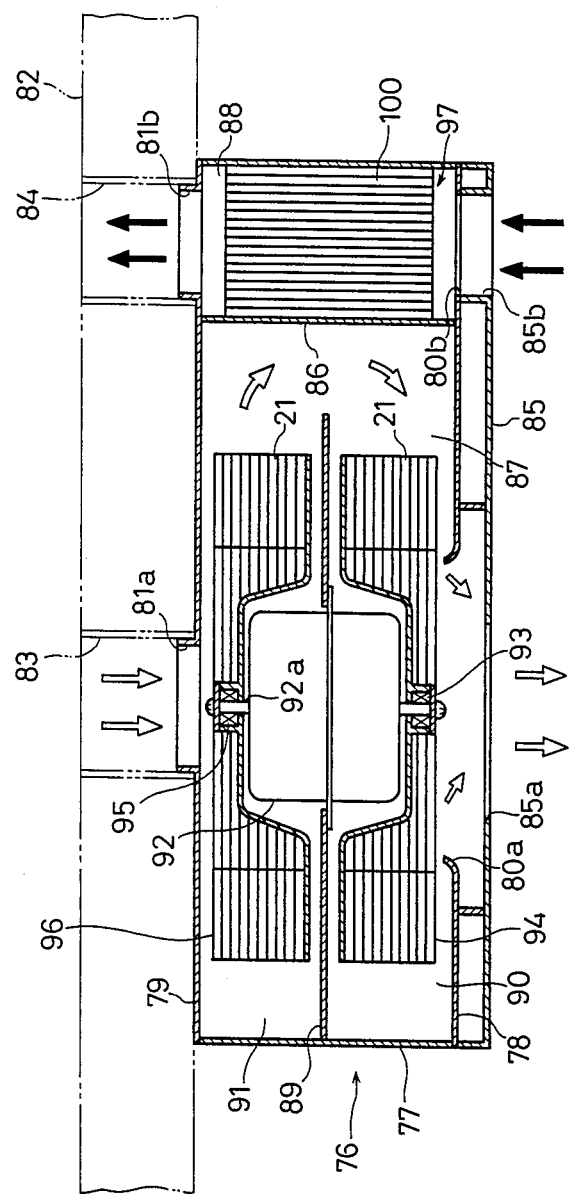
FIG. 17B is a view similar to FIG. 17A in a different operation mode of the ventilator from that in FIG. 17A.

In operation of the ventilator of the ninth embodiment, the motor 92 is energized for a minute to rotate its shaft 92a in the forward direction when the operation switch is turned on. Since the one-way clutch 93 transmits rotation of the motor shaft 92a to the centrifugal fan 94 for exhaust operation, the fan 94 is driven, while the centrifugal fan 96 is not driven. Consequently, air flows through the air paths 21 of the centrifugal fan 94 from the inner peripheral side to the outer peripheral side, thereby introducing indoor air into the casing 90 through the vents 85a and 80a. The indoor air is further introduced into the outer casing 91, where the indoor air flows through the air paths 21 of the centrifugal fan 96 in shutdown condition from the outer peripheral side to the inner peripheral side. The indoor air is then discharged outdoors through the duct 83. This exhaust air flow is shown by bold arrows in FIG. 17A. On the other hand, since the forced exhaust air flow causes the interior of the room to be in a negative pressure condition, outdoor air is forcedly introduced into the second air passageway 88 through the duct 84 and the vent 81b. The outdoor air is further introduced into the room through the air paths 100 of the heat exchanger 97. This suction air flow is shown by void arrows in FIG. 17A. The motor shaft 92a is rotated in the reverse direction under control of the timer means after the above-described exhaust operation continues for a minute. Since the oneway clutch 95 transmits the rotation of the motor shaft 92a to the centrifugal fan 96 for suction operation, it is driven while the centrifugal fan 94 is not driven. Rotation of the centrifugal fan 96 induces a forced suction air flow in the first air passageway 87. This suction air flow is shown by void arrows in FIG. 17B. Simultaneously, exhaust air flow is induced in the second air passageway 88. The exhaust air flow is shown by bold arrows in FIG. 17B. The forced exhaust operation shown in FIG. 17A and the forced suction operation shown in FIG. 17B are alternately reiterated. Since the exhaust air flows through the air paths 21 of the centrifugal fans 94 and 96 in the forced exhaust operation, heat is accumulated in the centrifugal fans 94 and 96. In the following forced suction operation shown in FIG. 17B, the low temperature suction air flows through the air paths 21 of the centrifugal fans 94 and 96 and the high temperature exhaust air flows through the air paths 100 of the heat exchanger 97. Consequently, the low temperature suction air introduced in the forced suction operation is heated owing to heat dissipation from both centrifugal fans 94, 96 when flowing through the air paths 21 thereof. Then, heated outdoor air is introduced into the room. In this while, the high temperature exhaust air flows through the air paths 100 of the heat exchanger 97, in which heat is accumulated. The heat accumulated in the heat exchanger 97 is dissipated to the suction air when the suction air flows through the air paths 100 of the heat exchanger 97 in the following forced exhaust operation, thereby introducing heated outdoor air into the room.

Tenth and eleventh embodiments (See FIGS. 19 and 20):

The ventilator of a tenth embodiment differs from that of the ninth embodiment in the two motors are employed instead of combination of the reversible motor and the one-way clutches.

Figure 19:
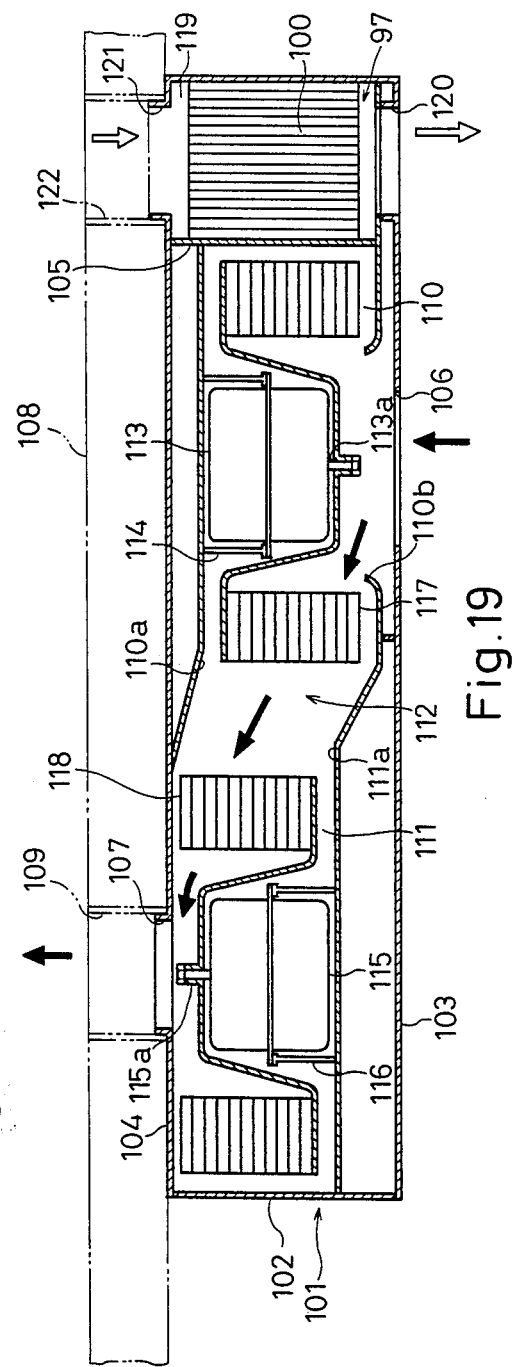
FIG. 19 is a view similar to FIG. 17A showing the ventilator of a tenth embodiment.

Referring to FIG. 19 which shows a cross section of the ventilator of the tenth embodiment, the housing 101 comprises the rectangular frame 102, the front grille 103 and the back plate 104. The front grille 103 and the back plate 104 are secured to the frame 102 so that the housing 101 is formed into the flat box-shape. A partition plate 105 is provided at the right-hand inside portion of the housing 101 so as to divide the interior of the housing 101 into two compartments. A vent 106 is formed in the right-hand portion of the front grille 103. A vent 107 is formed in the left-hand portion of the back plate 104. The housing 101 thus constructed is mounted, for example, on the side wall 108 of the room to be ventilated so that a duct 109 extending through the side wall 108 communicates to the vent 107. Casings 110 and 111 are formed within the housing 101. An outlet 110a of the casing 110 is adjacent to an outlet 111a of the casing 111 so that a first air passageway 112 is formed. In the first air passageway 112, an inlet 110b of the casing 110 communicates to the vent 106 and a suction area of the casing 112 communicates to the vent 107. A motor 113 is mounted on a support leg 114 in the central area of the casing 110 with the shaft 113a thereof directed toward the front grille 103. The other motor 115 is mounted on a support leg 116 in the central area of the casing 111 with the shaft thereof directed toward the back plate 104. Centrifugal fans 117 and 118 are mounted on the motor shafts 113a and 115a respectively. The centrifugal fans 117 and 118 for exhaust and suction operation respectively are identical with the fan in FIG. 5. The motors 113 and 115 are alternately energized, for example, at intervals of a minute. The right-hand compartment defined by the partition plate 105 serves as a second air passageway 19. Two vents 120 and 121 are provided in the front grille 103 and the back plate 104 respectively. The vent 121 communicates to the outdoors through a duct 122 extending through the side wall 108. The heat exchanger 97 of the heat accumulation type is provided in the second air passageway 119.

In operation of the ventilator of the tenth embodiment, the motor 113 is first energized to drive the centrifugal fan 117 for exhaust operation when the operation switch is turned on. Rotation of the centrifugal fan 117 induces a forced exhaust air flow in the first air passageway 112. Simultaneously, outdoor air is forcedly introduced into the heat exchanger 97 provided in the second air passageway 119. See void arrows in FIG. 19. The motor 113 is then deenergized and the other motor 115 is energized to drive the centrifugal fan 118 for suction operation. As the result of rotation of the centrifugal fan 118, a forced suction air flow is induced in the first air passageway 112. Simultaneously, indoor air is introduced into the heat exchanger 97. Accordingly, forced exhaust and suction operations are alternately reiterated and simultaneously, normal suction and exhaust operations are also reiterated alternately. Since exhaust and suction air flows are alternately introduced through the identical air passageway, the heat exchange is performed in the similar manner as shown in FIG. 17A. As compared with the ventilator shown in FIG. 17A, particularly, the centrifugal fans 117 and 118 are disposed transversely in the air flows within the air passageway, so that the ventilator can be rendered thinner than that shown in FIG. 17A.

Figure 20:
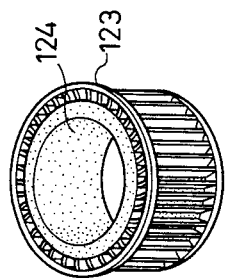
FIG. 20 is a perspective view of the centrifugal fan employed in the ventilator of an eleventh embodiment.

Although each centrifugal fan is formed of the heataccumulative material in the ninth and tenth embodiments, at least one of the centrifugal fans may be formed of the heat-accumulative material and the other fan may have the conventional construction. Furthermore, the centrifugal fan may not be formed of the heat-accumulative material so as to have heat accumulativeness. As shown in FIG. 20 as an eleventh embodiment, for example, a heat-accumulative material 124 having permeability may be provided along the inner peripheral side of a conventional centrifugal multiblade fan 123. In this case, the heat-accumulative material 124 is formed of a fiber having large heat capacity.

The foregoing disclosure and drawings are merely illustrative of the principles of the present invention and are not to be interpreted in a limiting sense. The only limitation is to be determined from the scope of the appended claims.

What is claimed is:

1. A ventilator of the heat exchange type comprising:
   (a) first and second air passageways each communicating between an interior of a room to be ventilated and the outdoors;
   (b) a first centrifugal fan for introducing outdoor air to the interior of the room and a second centrifugal fan for discharging indoor air outdoors, both said first and second centrifugal fans being disposed before and behind within said first air passageway in the direction of air flows;
   (c) a third centrifugal fan for introducing the outdoor air to the interior of the room and a fourth centrifugal fan for discharging the indoor air outdoors, both said third and fourth centrifugal fans being disposed before anf behind within said second air passageway in the direction of sir flows;
   (d) said first, second, third and fourth centrifugal fans being formed of a heat-accumulative material and having a number of radially extending air paths so that heat contained in the exhaust indoor air is accumulated in said centrifugal fans and that the heat accumulated therein is dissipated to the suction outdoor air; and
   (e) a means for driving said first and fourth centrifugal fans simultaneously and a means for driving said second and third centrifugal fans simultaneously, both said centrifugal fans driving means being alternately operated.

2. A ventilator of the heat exchange type as set forth in claim 1, wherein each of said centrifugal fans is provided with a plurality of auxiliary blades for inducing a further centrifugal blow action.

3. A ventilator of the heat exchange type as set forth in claim 1, wherein said centrifugal fans driving means are first and second electric motors alternately energized and deenergized and wherein said first and fourth centrifugal fans are mounted on both ends of a shaft of said first motor respectively and said second and third centrifugal fans are mounted on both ends of a shaft of said second motor respectively.

4. A ventilator of the heat exchange type as set forth in claim 1, wherein said centrifugal fans driving means include first and second reversible motor, the rotational directions of which are alternately reversed, a first clutch means for transmitting rotation of a shaft of said first motor to said first centrifugal fan when the shaft of said first motor is rotated in one direction and for transmitting rotation of the shaft of said first motor to said second centrifugal fan when the shaft of said first motor is rotated in the other direction, and a second clutch for transmitting rotation of a shaft of said second motor to said third centrifugal fan when the shaft of said second motor is rotated in one direction and for transmitting rotation of the shaft of said second motor to said fourth centrifugal fan when the shaft of said second motor is rotated in the other direction.

5. A ventilator of the heat exchange type comprising:
   (a) a first and second air passageways each communicating between an interior of a room to be ventilated and the outdoors;
   (b) a first centrifugal fan for introducing outdoor air to the interior of the room and a second centrifugal fan for discharging indoor air outdoors, both said first and second centrifugal fans being disposed before and behind within said first air passageway in the direction of air flows;
   (c) at least any one of said first and second centrifugal fans being formed of a heataccumulative material so that heat contained in the exhaust indoor air is accumulated in said centrifugal fan formed of the heat-accumulative material and that the heat accumulated therein is dissipated to the suction indoor air;
   (d) means for driving said first and second centrifugal fans alternately; and
   (e) a heat exchanger of the heat accumulation type provided in said second air passageway, said heat exchanger being formed of the heat-accumulative material and having a number of air paths.

6. A ventilator of the heat exchange type comprising:
   (a) an air passageway communicating between an interior of a room to be ventilated and the outdoors;
   (b) a first centrifugal fan for introducing outdoor air to the interior of the room and a second centrifugal fan for discharging indoor air outdoors, both said first and second centrifugal fans being disposed before and behind within said air passageway in the direction of air flows;
   (c) at least any one of said first and second centrifugal fans being formed of a heataccumulative material so that heat contained in the exhaust air is accumulated in said centrifugal fan formed of the heat-accumulative material and that the heat accumulated therein is dissipated to the suction air; and
   (d) means for driving said first and second centrifugal fans alternately.

* * * * *